(12) United States Patent
Bierhuizen (10) Patent No.: US 6,646,806 B1
(45) Date of Patent: Nov. 11, 2003

(54) POLARIZED LIGHT SOURCE SYSTEM WITH DUAL OPTICAL PATHS

(75) Inventor: Serge Bierhuizen, Wilsonville, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/150,212

(22) Filed: May 17, 2002

(51) Int. Cl.$^7$ .................. G02B 27/10; G02B 27/28; G03B 21/26; G02F 1/1335

(52) U.S. Cl. .................. 359/618; 359/619; 359/639; 359/640; 359/487; 359/495; 359/499; 353/20; 353/30; 353/31; 349/5; 349/9

(58) Field of Search ................. 359/618, 619, 359/621, 639, 640, 641, 629, 499, 494, 495, 485, 489; 353/20, 30, 31, 34; 349/5, 8, 9, 18

(56) References Cited

U.S. PATENT DOCUMENTS

| | | | |
|---|---|---|---|
| 5,098,184 A | 3/1992 | van den Brandt et al. .. | 353/102 |
| 5,410,370 A | 4/1995 | Janssen ..................... | 348/756 |
| 5,822,021 A | 10/1998 | Johnson et al. ............ | 348/742 |
| 5,900,985 A | 5/1999 | Ho et al. .................... | 359/640 |
| 5,953,083 A | 9/1999 | Sharp ......................... | 349/18 |
| 5,982,539 A | * 11/1999 | Shirasaki .................... | 359/484 |
| 6,024,451 A | 2/2000 | De Vaan et al. ............ | 353/20 |
| 6,084,703 A | 7/2000 | Dewald ....................... | 359/290 |
| 6,147,802 A | 11/2000 | Itoh et al. ................... | 359/500 |
| 6,154,320 A | * 11/2000 | Itoh et al. ................... | 359/618 |

(List continued on next page.)

OTHER PUBLICATIONS

Duelli et al., "Polarization Recovery System based on Light Pipes", 8 pps.

Dewald, U. S. patent application Publication No. US 2001/0008470 A1, Jul. 19, 2001, 10 pps.

Shimizu, "Invited Paper: Scrolling Color LCOS for HDTV Rear Projection", 2001, pps. 1072–1075.

Moench et al., "Invited Paper: New Developments in Projection Light Sources—Shorter Arcs and Miniaturisation", 2001, pps. 1274–1277.

Sharp et al., "High Throughput Color Switch for Sequential Color Projection", 2000, pps. 96–99.

Gardner et al., "New, High Performance, Durable Polarizers for Projection Displays", 2001, pp. 1287–1289.

Bierhuizen, U. S. patent application Publication No. US 2001/0035940 A1, Nov. 1, 2001, 5 pps.

Bachels et al., "Advanced Electronic Color Switch for Time–Sequential Projection", 2001, pps. 1080–1084.

Dewald et al., "Sequential Color Recapture and Dynamic Filtering: A Method of Scrolling Color", 2001, pps. 1076–1079.

Primary Examiner—Loha Ben
(74) Attorney, Agent, or Firm—Blakely Sokoloff Taylor & Zafman LLP (57) ABSTRACT

The present invention provides an enhanced an enhanced polarized light source for a display system. In one embodiment, the invention includes a light source to produce light having multiple polarization states, a relay optical system to relay light imaged onto the relay optical system onto a display, an optical imaging element to image light from the light source onto the relay optical system, a polarization separator to direct light of a first polarization to a first portion of the optical imaging element and light of a second orthogonal polarization to a second portion of the optical imaging element, and a polarization conversion element between the optical imaging element and the relay optical system to receive light having the second polarization from the optical imaging element and convert its polarization to the second polarization.

25 Claims, 4 Drawing Sheets

U.S. PATENT DOCUMENTS

| | | | |
|---|---|---|---|
| 6,176,583 B1 * | 1/2001 | Sawai | 353/20 |
| 6,217,173 B1 * | 4/2001 | Huang et al. | 353/20 |
| 6,227,682 B1 | 5/2001 | Li | 362/302 |
| 6,266,105 B1 | 7/2001 | Gleckman | 348/743 |
| 6,278,552 B1 | 8/2001 | Ishihara et al. | 359/619 |
| 6,331,879 B1 | 12/2001 | Sawai et al. | 349/9 |
| 6,341,867 B1 | 1/2002 | Itoh | 353/20 |
| 6,348,997 B1 * | 2/2002 | Itoh | 359/487 |
| 6,491,396 B2 * | 12/2002 | Karasawa et al. | 353/20 |
| 6,499,844 B2 * | 12/2002 | Bierhuizen | 353/20 |

* cited by examiner

POLARIZED LIGHT SOURCE SYSTEM WITH DUAL OPTICAL PATHS

BACKGROUND OF THE INVENTION

1. Field of the Invention

The invention relates generally to the field of polarized light sources, such as polarization conversion systems (PCS) for viewing displays directly or by projection. More particularly, the invention relates to a polarized light source with two optical paths of different polarization to enhance brightness.

2. Description of the Related Art

Many displays used in projection and direct viewing systems operate on the basis of polarization. Such displays include reflective displays such as LCoS (Liquid Crystal on Silicon), super twisted nematic (STN), and ferroelectric (FLC) as well as transmissive displays, such as thin film transistor (TFT), poly-silicon (P-si), and Silicon-on-Insulator (SOI). These displays can produce a high resolution image by changing the polarization state upon reflection or transmission of incident light. In an LCoS display, for example, in the dark state, a pixel reflects all light with substantially no change in polarization. In the bright state, the pixel rotates the polarization state of reflected incident light to the corresponding orthogonal state. By illuminating the display with polarized light and then filtering out nearly all reflected light of that polarization, the display image can be viewed by the human eye or projected onto a viewing screen.

In a single panel projection system, the display is illuminated with short bursts of red, green, and blue light while the display is synchronized to the pulsed light source to reflect the appropriate color component of the image. A white light or other color light burst can also be used alone or in combination with the red, green, and blue light. The short bursts can come from a color wheel or from pulsed LEDs (Light Emitting Diodes). The rapidly alternating red, green, and blue images are blended in human perception to form the full-color image of the display. However, the display can also be illuminated with monochromatic light for data or targeting displays. Such displays are used, for example in helmet, windshield, and visor projection systems as well as in small portable projectors and handsets for private display viewing and for virtual reality systems.

Since most conventional low cost light sources produce light with mixed polarization states, the light is typically analyzed by a PBS (Polarizing Beam Splitter). Light of one polarization (usually S-polarization) direction propagates through the PBS, while light of the orthogonal polarization (usually P-polarization) direction is reflected by the PBS. Another common approach is to use a polarizing filter that absorbs light of one polarization direction. Normally in such systems without a polarization conversion system, half of the light is lost either from reflection or absorption. This results in a dimmer display or requires a brighter light source. In a projector, a dimmer display is more difficult to view, while a brighter light source increases the power consumption and the cost of the projector system. Due to the additional heat typically generated, the brighter light source may require a larger housing to provide enough room for cooling or to accommodate a fan to cool the light source. The fan adds additional cost, power consumption and noise.

In order to increase efficiency, a multi-PBS can be used instead of the simple single PBS. The multi-PBS has a two dimensional array of small polarizing beam splitters and associated lenses. The beam splitters and lenses are precisely aligned so that the output of the multi-PBS is substantially collimated and has a single polarization state. The multi-PBS converts almost all of the input light to the same polarization state. However, it is expensive to produce due to the complex structures required and the precision required to align each of the PBS structures with each lens. The multi-PBS therefore increases the cost of the projection system.

Another disadvantage of the multiple and single PBS systems comes from a difference in the transmissivity over different incident angles in a typical PBS between horizontal and vertical axes. In most cases, the PBS will transmit light received at a greater range of incident angles in one axis than in the other. Thus the PBS may be more efficient in the one direction than in the other direction. The efficiency of the PBS can be increased by spreading the light in that direction, however, the angular intensity distribution for a conventional PCS (polarization conversion system) is point symmetrical around the center.

BRIEF SUMMARY OF THE INVENTION

A method and apparatus are described that provide an enhanced polarized light source for a display system. In one embodiment, the invention includes a light source to produce light having multiple polarization states, a relay optical system to relay light imaged onto the relay optical system onto a display, an optical imaging element to image light from the light source onto the relay optical system, a polarization separator to direct light of a first polarization to a first portion of the optical imaging element and light of a second orthogonal polarization to a second portion of the optical imaging element, and a polarization conversion element between the optical imaging element and the relay optical system to receive light having the second polarization from the optical imaging element and convert its polarization to the second polarization.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

The present invention provides a less expensive and more efficient illumination source for reflective and transmissive displays using two optical paths together, each having a different polarization state for a portion of the path. It also provides an intensity pattern that is spread in one direction, further enhancing efficiency through typical PBS (polarizing beam splitter) materials. It can be applied as a PCS (polarization conversion system) for a reflective LCD (liquid crystal display) in a projector system as well as in many other ways. As a result, lower cost at equal or higher system performance in brightness and contrast can be achieved.

Figure 1:
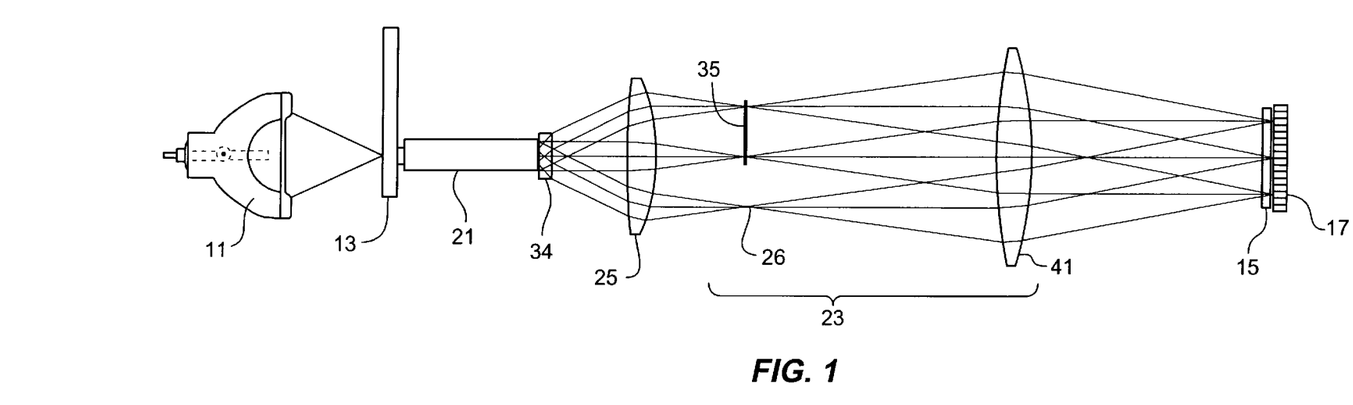
FIG. 1 is a cross-sectional side view diagram of a projector illumination system incorporating one embodiment of the present invention for a transmissive display panel.

An example of one embodiment of the present invention is shown in FIG. 1. The embodiment of FIG. 1 is particularly suitable for a projector using a transmissive display such as an LCD or light valve display, however any other reflective or transmissive display can be used. In the embodiment of FIG. 1, the illustrated components constitute a back light for the transmissive display. In brief, light from a projector lamp system 11, is filtered by a red, green, blue color wheel 13, and filtered by a reflective polarizer 15 to be incident on a transmissive display 17. In some embodiments, the color wheel may also include a white section in addition to or instead of the red, green and blue portions. Alternatively, an LED illumination system or any of various other illumination systems can be used.

The P-polarized light that is passed through the polarizer and incident on the display is transmitted though the display for bright portions of the image and reflected or absorbed for dark portions of the image. The transmitted light is passed into a projector lens (not shown) or other imaging system directly or through further optical elements. The projector lens images the display on a screen (not shown). The images can be still or motion images from any type of image or video medium. The system can be used as a projector for computer generated slides and for digital sourced imagery, however, many other applications such as games, movies, television, advertising and data display can be made. The invention can also be readily adapted to reflective displays as well as for any type of films or plates for which polarized illumination is desired. The system of FIG. 1 is also coupled to various display drivers (not shown). The display drivers receive image or video signals and power and convert the signals into a form suitable for driving the display and the lamp system.

Considering the example of FIG. 1 in more detail, the lamp system 11, and color wheel 13 couple light from the lamp system into a tunnel 21. The tunnel partially illuminates and collimates the light and gives it a desired uniformly illuminated cross-sectional shape. A typical tunnel has a rectangular cross-section and is either straight or smaller at its entrance near the light source and larger at its exit, however, any type of light collimation device or light source may be used. For a typical projector, the desired cross-sectional shape is a rectangle designed to accommodate the aspect ratio of the projected images. The images may have an aspect ratio of, for example, 4:3 for computer displays or 16:9 for movie displays. The aspect ratio can be chosen to match that of the display 17. Various known techniques can be used to render the projected image in an aspect ratio different from that of the display, if desired.

The lamp system, color wheel, and tunnel may be of a conventional design or any other design depending on the particular application. The color wheel may be replaced with any other type of color selection or modulation system or eliminated if the lamp system is capable of producing light of different colors or if only one color is desired In one embodiment, the lamp system is a set of red, green and blue LEDs (light emitting diodes) that are pulsed in synchronization with the display to create the different colors that are shown to the viewer. In another embodiment, three different systems one for each color, red, green and blue, with three different displays 43 are provided and the three images are optically combined for viewing. Such systems can use a single lamp with the colors divided up using prisms or dichroic mirrors as is well-known in the art.

Light from the tunnel 21 enters an imaging element 25 and a relay optical system 23 made up of a single optical element 45. These elements can be conventional spherical lenses. Various aspheric, diffractive, or Fresnel surfaces can be included as may be desired to achieve cost and size goals for the system. Prisms, mirrors, and additional corrective elements may also be added as appropriate to fold, bend or modify the illumination light for the intended application. The relay optical system is designed to create a telecentrically illuminated image at the display of the substantially uniform tunnel exit. The imaging element 25 makes an intermediate image of the lamp system at the intermediate position 26 of the relay system. The lens 41 of the relay system also re-images the intermediate lamp image at infinity. If a different lamp system were used, then appropriate modifications can be made to the imaging element and the relay optical system to accommodate the differences. The display can also be illuminated non-telecentrically if it does not suffer from angular dependencies that degrade the image quality.

With the telecentric light source of the present embodiment, the lamp system is assumed to be at infinity. The first element 25 has a focal length f1 that equals the distance from its focal plane to the exit aperture end of the tunnel and from its focal plane to the intermediate image position 26. Accordingly, the exit aperture end of the tunnel is imaged at infinity. The light from the lamp system, which is substantially telecentric on exiting the tunnel, is imaged at the intermediate position 26 in the system. As mentioned above, any other source of telecentric or non-telecentric illumination can be used instead of the lamp, color wheel, tunnel system shown in the drawings. The optical element 25 can be adapted accordingly to produce a lamp image at the intermediate position depending on the nature of the illumination system. As mentioned above, the lens 25 can be replaced with multiple optical elements of various types, as appropriate. Accordingly, converging and diverging light sources can be used with appropriate adjustments to the imaging and relay optical systems.

Considering the focal lengths in more detail, the first lens 25 has a focal length f1 and is placed at approximately the same distance, f1, from the light tunnel 21. Accordingly, it makes a lamp image and has its exit pupil at the position 26 that is a distance f1 away. The second lens 41 has a focal length of f2 and is placed at that distance, f2, from the intermediate position 26 and from the display. The second lens re-images the pupil from the first lens, i.e. the lamp image at intermediate position 26, at infinity for telecentric illumination at the display panel. It also images the output end of the tunnel at the position of the display panel.

As can be seen in FIG. 1, the imaging lens 25 is centered on the tunnel to produce the image at the intermediate position 26. In other words, the optical axis of the imaging lens is aligned with the center of the tunnel, however, other configurations are possible. The lens 41 of the relay system is also centered with respect to the lamp system, the tunnel, and the first lens. Both lenses are also roughly centered about the display as is shown in FIG. 1. This means that the light from the lamp system arrives at the imaging lens and remains centered through to the display.

The lenses need not be exactly centered with respect to the tunnel or the display, as shown in the figures. Each one can be moved slightly if the other is decentered. In addition, if any of the components are placed at an angle then the first and second lenses can be moved accordingly. The placement of the lenses in the illustrated embodiment has been selected to minimize the dimensions of the optical system. If the first lens is shifted, or if the reflective polarizer or mirror is placed at an angle, some dimensions may be increased, however, the elements can be moved in a variety of different ways to meet particular size and form factor constraints.

A reflective polarizer 15 is placed between the relay optical system and the display. The polarizer can be a prism, polarizing beam splitter (PBS), beam splitting cube, wire grid, or film. A variety of different known reflective polarizing devices can be used, such as a polymer film stack or dielectric coating stack. A wire grid polarizer can be used as the polarizer in place of a typical anisotropic-isotropic polymer film stack. Such a polarizer is described, for example, in U.S. Pat. No. 6,122,103 to Perkins et al. A suitable wire grid polarizer is the ProFlux™ polarizer, available from Moxtek of Utah in the United States. Alternatively, an absorptive polarizer such as a dichroic filter can be used.

The reflective polarizer 15 receives light from the relay lens 41, reflects, or alternatively absorbs, the S-Polarized component of the light from the lamp system, and passes the P-polarized component. The P-polarized component will propagate on to the display 17. As mentioned above, the light from the end of the light tunnel will be imaged on the display 17 by the relay optical system 23. The viewing optics, for example a projector lens, projects the image onto a screen. In another embodiment, the viewing optics are a viewing screen with magnifying optics. The viewing optics can include a polarizing analyzer, such as an iodine-based PVA (poly-vinyl alcohol) film, or a wire grid polarizer to filter out any stray P-polarized light, enhancing contrast. Analyzers and polarizing filters can also be placed in other locations of the system as may be appropriate for a particular application or lamp system.

Light for dark portions of the display will be reflected from the display with no change in polarization, as P-polarized light. This will be passed through the PBS back toward the lamp system 11. A portion of this light will be recovered in the system and reflected back toward the display. The particular display and projector optics configuration shown in the figures is shown as an example only, the present invention can also be applied to other types of display and viewing configurations.

In the description above, only P-polarized light has been used to illuminate the display, however, a typical lamp will produce P and S-polarized light. Current typical lamp types include tungsten, halogen and metal halide, but any type of lamp including LEDs can be used. As a result, the light exiting the tunnel 21 after passing through the light modulator 13 will be of mixed polarizations. Even colored emissions from LEDs are of mixed polarization. In order to increase the efficiency of the light source, the system is also provided with a polarization separator 34. The polarization separator can be located anywhere between the tunnel 21 and the imaging lens 25. The polarization separator in the example of FIG. 1 directs the P-polarized light at a downward angle and the S-polarized light at an upward angle. As explained below, sending the two polarization states in different directions allows them to be treated differently.

The polarization separator can take any of several different forms. In one embodiment, it is a standard Wollaston prism or an array of Wollaston prisms. A Wollaston prism can be made by cementing two prisms made from a positive uniaxial material, such as quartz together with their polarization axes orthogonal to each other. Different relative indices of refraction in the orthogonal directions of the crystalline prism material will result in different angles between the two separated polarized beams. A difference in the indices of more than 1.5 has been found to provide a good angular separation.

Figure 2:
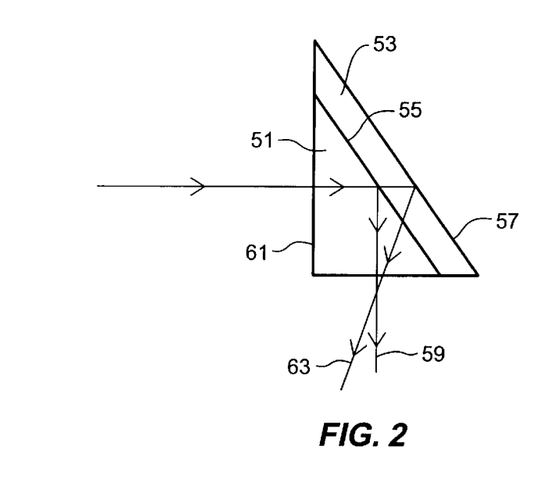
FIG. 2 is an enlarged cross-sectional view of a portion of a polarization separating prism suitable for use as a polarization separator in the present invention.

As an alternative, a polarization separator can be made by cementing two prisms together with a polarizing beam splitting layer in between. Referring to FIG. 2, the first prism 51 is a half cube cut at a diagonal and the second prism 53 is a wedge with a flat surface cemented to the diagonal cut. A polarizing beam splitter film coating or surface 55 is applied between the prisms on the diagonal surface. The wedge prism has a mirror coating 57 on the flat surface opposite the diagonal cut. S-polarized light 59 entering a flat surface 61 of the half cube prism is reflected by the beam splitter at the diagonal surface. P-polarized light 63 passes to the wedge prism and is reflected by the mirror surface but due to the angle of the mirror with respect to the beam splitting film, the P-polarized light is reflected in a direction different from the P-polarization. Further prisms or mirrors can be used to unfold the light path to the linear configuration shown in FIG. 1, if desired.

Figure 3A:
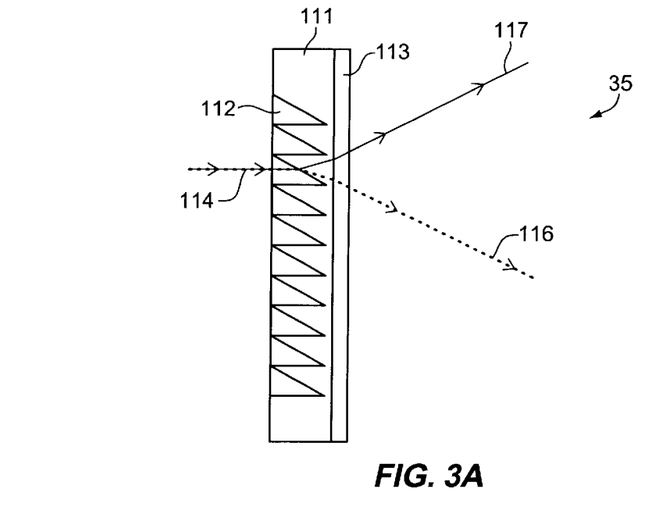
FIG. 3 is a cross-sectional view of a liquid crystal-based polarization separator suitable for use with the present invention.
Figure 3B:
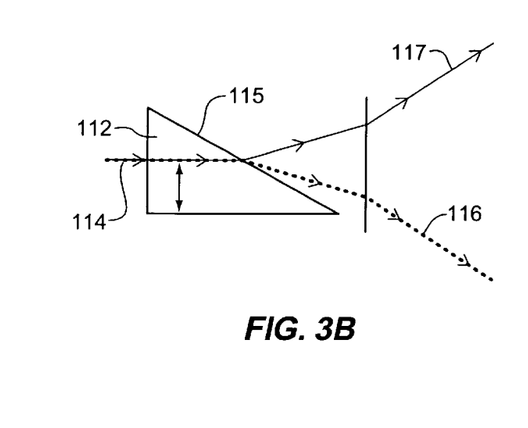

As an alternative, a stacked array of thin films with alternating perpendicular axes can be used. The films can be created by a fine pitch molding process. In another embodiment, the polarization separator can be made using a liquid crystal layer. FIGS. 3A and 3B show a liquid crystal layer 111 sandwiched between a prism 112, which has serrate grooves, and a glass layer 113. Such a structure is shown, for example in U.S. Pat. No. 6,147,802 to Itoh, et al. Molecules of the liquid crystal are aligned in parallel with the grooves of the prism 112, so that light entering perpendicular to the prism is split into a P-polarized ordinary ray 116 and an S-polarized extraordinary ray 117 corresponding to the molecules of the liquid crystal. More particularly, light 114 of mixed polarization from the tunnel enters through the flat surface of the prism 112, it is incident on the inclined surface of the groove of the prism 112. When the refractive index of the molecules of the liquid crystal corresponding to the ordinary ray are equal to that of the prism 112 then the ordinary ray 116 is not refracted at the inclined surface 115 of the prism but travels in a straight line. However, the extraordinary ray 117 is refracted. The angular difference between the direction in which the ordinary ray travels and the extraordinary ray travels is a function of the ratio of the index of refraction of the liquid crystal and the prism.

If the prism 112 is made of PMMA (polymethylmethacrylate) or polycarbonate, then with commercially available liquid crystals, the diverging angles of output light with respect to a normal to the prism can range from about 5 to 20 degrees in each direction. The specific angle will depend on the construction of the prism. Higher angles allow for a shorter distance between the polarization separator and the imaging lens. This permits a smaller construction for the light source overall while still completely separating the two polarization states from each other. The angle formed between the flat surface and the inclined surface of the prism 112 can also be adjusted to obtain the desired amount of separation between the two polarization states. It has been found that 37 degrees works well. Additional angles for the tunnel and other components can be added to obtain the desired housing form for a particular application.

The polarization separator can alternatively be produced by using an organic film instead of the liquid crystal. For example, a retardation film can be made with stamped serrate grooves. Alternatively, the monomers of a film can be aligned and then polymerized by using ultraviolet rays or heat. Regardless of the construction materials used, the polarization separator provides higher performance with the rest of the optical components if it is made to be as thin as possible. On the other hand, the number of prisms should be kept low (on the order of tens per square millimeter) in order to reduce scattering and keep costs low. The optimal balance between thickness and the number of prisms will depend upon the particular application.

Referring again to FIG. 1, the relay lens 41 is centered with respect to the tunnel, the intermediate image 26, and the imaging lens 25, so that the two diverging polarization states from the polarization separator are each formed into a half cone of light with respect to the relay lens. The P-polarized ordinary ray travels through what is shown in FIG. 1 as the lower half of the imaging and relay lenses. The S-polarized extraordinary ray travels through the upper half of the lenses. At the position of the intermediate image 26 created by the imaging lens 25, in the upper half of the path, there is a half-wave plate that rotates the direction of polarization of any light that passes through it. The half-wave plate is in the path of the S-polarized light and rotates it to P-polarized light so that virtually all the light that impinges on the relay lens 41 is P-polarized. Any other polarization conversion device can be substituted for the half-wave plate. The half-wave plate can be mounted in a variety of different positions between the polarization separator and the display. The location of the intermediate image provides good results because the two different polarization states emanating from the polarization separator are well separated at that location. Between the second lens 41 and the display the two optical paths tend to overlap.

The S-polarized light deflected by the polarization separator and the imaging lens is then converted by the half-wave plate to P-polarized light which, after passing through the relay lens 41, will also pass through the reflective polarizer 15 to the display 17. The combination of the polarization separator and the half-wave plate allows virtually all of the S-polarized light from the light source to be recovered and imaged onto the display 17. Except for losses and scattering in the polarization separator, lenses and other components, the intensity of the illumination on the display is doubled as compared to many systems without the cost of a multi-PBS or other expensive polarization conversion systems. When the light in the upper path is combined with the light that travels the lower path from the lamp system to the display, a brighter, sharper image results.

While the actual optical paths from the light source to the display will vary depending on the nature of the polarization separator and the relay optics, the imaging quality of the display is improved by making the two path lengths from the lamp system to the display close to the same length. The exact position of the lamp system is somewhat imprecise. It can be measured as the image of the exit pupil of the light source. In the illustrated embodiments, the lamp can be considered as being located near the exit pupil of the light tunnel, i.e. the end of the light tunnel closest to the relay optical system. The optical components can be positioned so that the optical path lengths differ by any integer multiple other than two. This ensures that the light from both the upper and lower paths is imaged on the display. In the illustrated embodiment, the upper and lower path lengths, for the two polarization states, respectively, are the same. This provides good window imaging, however, the path lengths may be made different to accommodate particular applications. When light from the two paths is combined, a brighter, sharper image results.

At the display 17, the angular intensity distribution, i.e. the angular spread or the light transmission as a function of the incident angle, e.g. azimuth $\theta$ and polar angle $\phi$, of the light produced by the lamp system into the entrance pupil of the projection lens will look like two elongated hot spots one above the other. The lower hot spot will come from the lower optical path direct from the lamp system. The second hot spot comes from the upper optical path through the half-wave plate. The light intensity is spread over the horizontal about the two vertically aligned spots (a horizontal line can be regarded as a line going through the plane of the page in FIG. 1, while a vertical line is a vertical line in FIG. 1). The two hot spots correspond to a central area with an average incident angle close to perpendicular to the display. The average angle of the incident light diverges steadily from the perpendicular with distance from the center. A conventional system might produce a central circular hot spot of angular intensity distribution rather than the two spread elliptical hot spots of the illustrated embodiment. If the reflective polarizer is properly selected and positioned, this elliptical spreading property of the illumination can be exploited to improve the efficiency of the reflective polarizer.

Many types of reflective polarizers and polarizing beam splitters (PBS) have an angular dependence on transmissivity that differs between orthogonal axes. In one axis, e.g. the horizontal, a greater range of incident light angles will be transmitted than in the other orthogonal axis, e.g. the vertical. A dichroic PBS prism, a wire grid polarizer, cholesteric reflective polarizer and some PBS film stacks all show this property. By spreading the angular intensity of the light in the horizontal axis as the configuration of FIG. 1 does, more light will be transmitted through the polarizer than if the angular intensity were symmetrically diminishing around a central point. This property can be exploited by properly positioning the polarizing materials so that the axis of the greater angular transmission characteristic or the greater angular acceptance is aligned with the angular intensity distribution of the illumination. Stated another way, the transmissivity of the system is improved by matching the direction of elongation of the hot spots to the direction of the high contrast isocontrast curve of the particular polarizer. The increased efficiency will be accompanied by a commensurate increase in brightness and contrast.

The benefit of the horizontal spreading of the angular intensity is greater the larger the number of polarizers and PBS's. In some projector systems, for example, several prisms are used to separate colors for different light modulation panels and then recombine colors for display. As a result, eight or nine PBS surfaces may be used in a single system. The benefits are also greater when the polarizing layer is at an angle to the central ray of the incident illumination as, for example, with a typical polarizing beam splitter cube. The horizontal spreading of angular intensity provides benefits at each one of these prisms significantly enhancing the brightness and contrast of the display. Great benefits may also be realized for small direct viewing prism-based displays. Horizontal and vertical are used in the present description to aid in understanding and convenience. The designation of particular axes can be adapted to suit any particular application and need not be Cartesian or orthogonal. Diagonal and polar directions can also be used to spread the light's angular intensity distribution so as to increase transmission.

Figure 4:
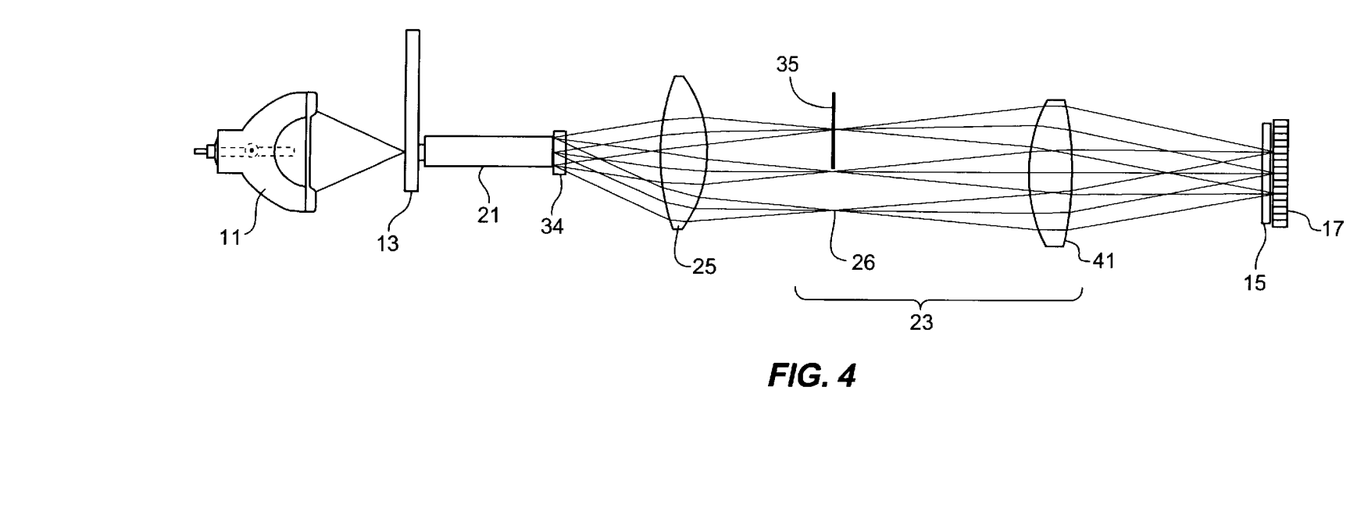
FIG. 4 is a cross-sectional side view diagram of a projector illumination system similar to that of FIG. 1 and adapted for use with a Rochon-type prism.

FIG. 4 shows another embodiment in which a different polarization separator is used, for example, a Rochon prism. This prism does not produce equal deflections of S and P-polarized light. Instead, as described in more detail with respect to FIG. 5, the S-polarized light is substantially unaffected while the P-polarized light is deflected downward. This difference can easily be accommodated, for example, by decentering the imaging lens. The imaging lens is decentered far enough to compensate for and correct the deflection of the illumination from the tunnel, without combining the two optical paths from the polarization separator 34. The relay optical system 41, however, is roughly centered about the display as in FIG. 1. This allows the relay lens to center the image of the light on the display after it is deflected by the polarization separator.

In operation, as shown by the ray tracings in FIG. 4, light from the color wheel and tunnel is divided by the polarization separator 34 into two different polarization states which exit the polarization separator at different angles. Both lamp images are imaged by the imaging lens 25 at the intermediate position 26 and relayed through the relay lens 41 to the display. The P-polarized ordinary rays are deflected downwards in the figure and pass through the bottom halves of the lenses. The S-polarized extraordinary rays are not deflected and traverse the top half of all of the lenses. This path includes the half-wave plate 35 at the intermediate image which converts the light of the extraordinary rays to P-polarized light.

Before hitting the display, all of the light strikes the reflective polarizer 15. P-polarized light is passed to be imaged on the display. The light transmitted through the display as an S-polarized image is imaged by the projector optics for viewing. Any trace S-polarized light from the lamp that strikes the polarization reflector is reflected back toward the lamp where it will be recycled or scattered by the polarization separator. As in the embodiment of FIG. 1, the polarization reflector can be a prism or a wire-grid polarizer. The wire-grid polarizer can provide reduced angular dependency and skew ray compensation requirements. This system will also produce the two horizontally spread intensity hot spots discussed above. The horizontal spreading can be exploited to improve brightness and contrast of the viewed image as discussed above.

Figure 5:
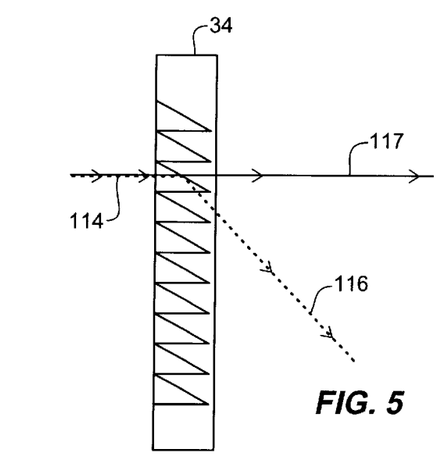
FIG. 5 is a cross-sectional view of a Rochon prism suitable for use in the embodiment of FIG. 4.
Figure 6:
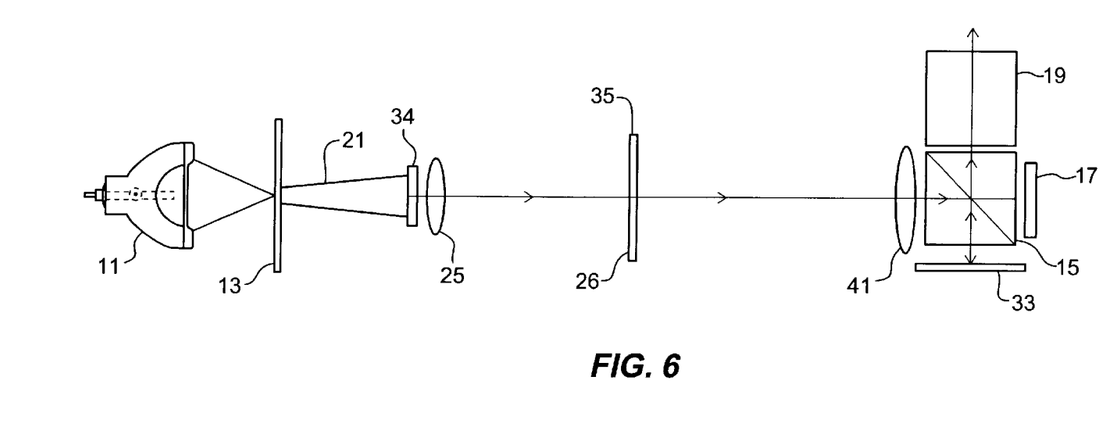
FIG. 6 is a cross-sectional top view diagram of a projector illumination system similar to that of FIGS. 1 and 4 and adapted for use with a reflective display panel.

As shown in FIG. 5, the polarization separator 34 of FIG. 4 also divides light of mixed polarization into ordinary P-polarized rays and extraordinary S-polarized rays. However, the extraordinary ray is not deflected from its entering angle of incidence. The ordinary ray, on the other hand is deflected more significantly from the original angle of incidence. A variety of structures operate in this way one such structure is a Rochon-type prism with orthogonally oriented prism structrures as shown in FIG. 5. The Rochon prism can be constructed in the same way as a Wollaston prism discussed above using materials with a different indices of refraction. The structure of FIG. 5 shows a series of prisms constructed in a column from two pieces of materials. A variety of other polarization separation devices can be used instead, as described in more detail above FIG. 6 shows another embodiment of the present invention in which the light source is adapted for a reflective display, such as an LCoS or STN display. The system accordingly is designed to act as a front light. The system is shown as a top cross-sectional view as compared to the side view of FIGS. 1 and 4. The lamp system, tunnel, polarization separator, imaging optics and relay optics are substantially the same as those shown in FIGS. 1 and 4. The decentering shown in FIG. 4 is not visibly different from the centered lenses of FIG. 1 in this top view. Also in contrast to FIGS. 1 and 4, only a central ray is shown for simplicity.

In operation, as shown by the central ray, light from the color wheel 13 and tunnel 21 is divided by the polarization separator 34 into two different polarization states which exit the polarization separator at different angles. Both are imaged by the imaging lens 25 at the intermediate position 26 and relayed through the relay lens 41 to the display 17. The P-polarized ordinary rays are deflected downwards into the page in the figure and pass through the bottom halves of the lenses. The S-polarized extraordinary rays traverse the top half of all of the lenses. This path includes the half-wave plate 35 which converts the light of the extraordinary rays to P-polarized light.

A PBS 15 is placed between the relay optical system and the display. The PBS can be a prism, beam splitting cube, wire grid, or film. A variety of different known beam splitting devices can be used, such as a polymer film stack or dielectric coating stack at the diagonal beam splitting surface. The PBS 15 receives light from the relay lens 41, reflects the S-Polarized component of the light from the lamp system, and passes the P-polarized component. The P-polarized component will propagate on to the display 17. As mentioned above, the light from the end of the light tunnel will be imaged on the display 17 by the relay optical system 23. At the display, light for bright portions of the display image will be rotated in polarization to S-polarized light and reflected from the display back to the PBS. The PBS is placed at an angle to the display and the incident light from the relay optical system so that the image reflected from the display will be directed to viewing optics 19. As mentioned above, the viewing optics can take any of a variety of different forms, including eyepieces and projection lenses.

In the illustrated embodiment, the PBS is configured with a geometry similar to a conventional beam-splitting cube, in which the PBS is at a 45 degree angle to the display and the light propagating from the lamp. Other geometries can be selected to meet packaging and price considerations. The viewing optics 19, for example a projector lens, are placed perpendicular to the display in a location to receive light reflected from the PBS. As a result, light from the display which constitutes the image to be viewed will be reflected to the viewing optics 19. The viewing optics can include a polarizing analyzer, such as an iodine-based PVA (polyvinyl alcohol) film, or a wire grid polarizer to filter out any stray P-polarized light, enhancing contrast. Analyzers and polarizing filters can also be placed in other locations of the system as may be appropriate for a particular application or lamp system.

Light for dark portions of the display will be reflected from the display with no change in polarization, as P-polarized light. This will be passed through the PBS back toward the lamp system 11. A portion of this light may be recovered in the system and reflected back toward the display. Any trace S-polarized light that strikes the PBS from the lamp system is reflected from the PBS out of the optical path of the lamp and the display to a mirror 33. The mirror is positioned parallel to the optical axis of the relay optical system, so that light reflected from the PBS is reflected to the mirror and from the mirror is reflected with no significant change in polarization back to the relay optical system, toward the lamp. Alternatively, the mirror can be replaced by light absorbing materials or a window to transmit the light out of the system. Since the amount of S-polarized light striking the PBS is small, the light loss will also be small. This system will also produce the two horizontally spread intensity hot spots discussed above. The horizontal spreading is still more beneficial if, as shown in FIG. 6, the PBS has an angled beam splitting surface.

Figure 7:
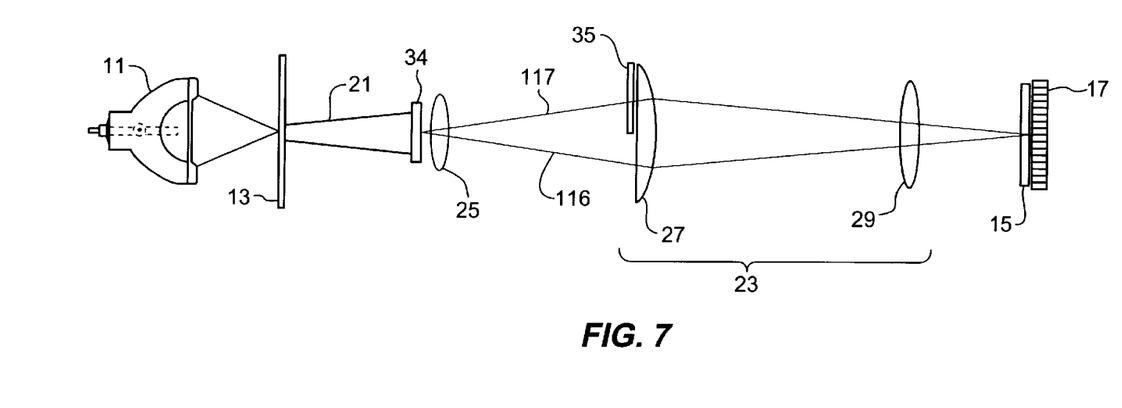
FIG. 7 is a cross-sectional side view diagram of a projector illumination system incorporating another embodiment of the present invention for a transmissive display panel.

FIG. 7 shows an embodiment of the present invention similar to that of FIG. 1 but in which the relay optical system 23 includes two lenses. The first lens 27 is positioned at the intermediate position 26 as shown in FIG. 1 and the second lens 29 replaces the relay lens 41 of FIG. 1. The half-wave plate 35 can be combined with the first relay lens 27. Such a three lens system can be adapted to any of a variety of different polarization separators including those described above. The lens positions and focal lengths can be adjusted, for example, as shown in FIGS. 1 and 4 to accommodate different light output patterns from the polarization separator and the light source. In particular, the imaging lens 25 can be decentered to accommodate a Rochon prism as the polarization divider.

In operation, as shown by the ray tracings in FIG. 7, light from the color wheel and tunnel is divided by the polarization separator 34 into two different polarization states which exit the polarization separator at different angles. Both are imaged by the imaging lens 25 onto the first relay lens 27 and relayed through the second relay lens 29 to be imaged on the display 17. The P-polarized ordinary rays 116 are deflected downwards in the figure and pass through the bottom halves of the lenses. The S-polarized extraordinary rays 117 are deflected upward and traverse the top half of the lenses. This path includes the half-wave plate 35 which converts the S-polarized light of the extraordinary rays to P-polarized light.

In the example shown in FIG. 7, the half-wave plate 35 that rotates the polarization direction of the S-polarized light is placed directly before the second relay lens 27. This half-wave plate can be a separate component behind the relay lens or it can be a coating applied directly to the relay lens. In one embodiment, the second relay lens 27 can be a plano-convex lens with its curved surface facing the display. As a result, the flat, planar surface can be coated to produce the half-wave plate. Applying the half-wave plate as a coating instead of using a separate component reduces the parts count and assembly cost of the final product. Alternatively, any other polarization conversion device in any of the positions discussed above can be substituted for the half-wave plate.

Figure 8:
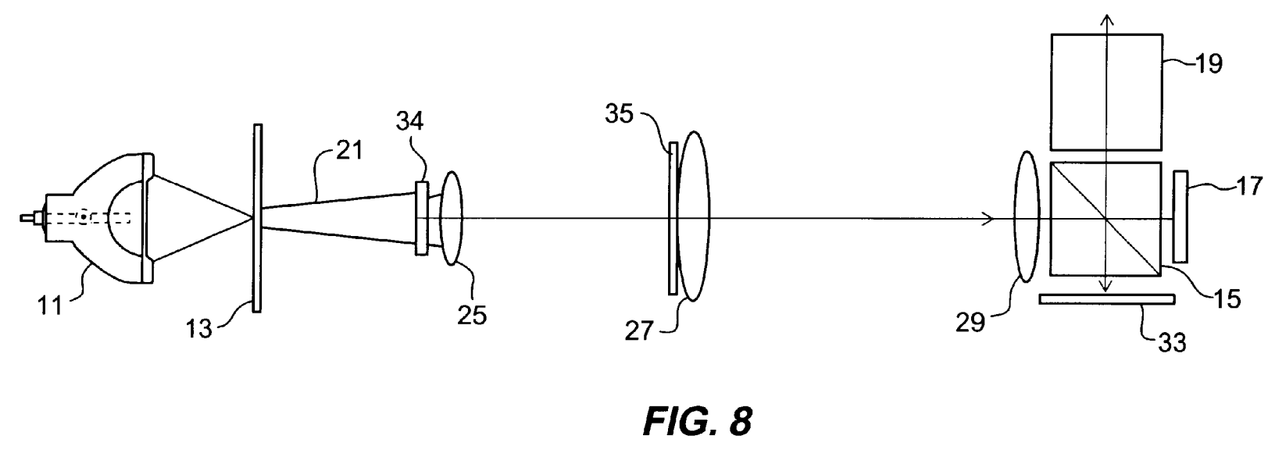
FIG. 8 is a cross-sectional top view diagram of a projector illumination system similar to that of FIG. 7 and adapted for use with a reflective display panel.

FIG. 8 shows an adaptation of the system of FIG. 7 for use with a reflective display. The light source, color wheel 13, tunnel 21 polarization separator 34, imaging lens 25, relay lens system 23 and half-wave plate 35 are substantially the same as in FIG. 8. However, as in FIG. 6, a PBS 15 is added to the system 17 to illuminate the reflective display. As with FIGS. 1, 4 and 7, any of a variety of similar components well known in the art can be substituted for the light source, color wheel and tunnel.

As in the embodiment of FIG. 6, the P-polarized light that passes through the PBS 15 is incident on the display 17 and, for bright portions of the image, is reflected from the display as S-polarized light. S-polarized light is reflected off the other side of the PBS 15 and into viewing optics 19. Light corresponding to dark portions of the image is reflected as P-polarized light through the PBS toward the lamp. Any S-polarized light from the lamp that strikes the PBS is directed out of the optical path of the lamp and the display to a mirror 33. The mirror is positioned parallel to the optical axis of the relay optical system, so that light reflected from the PBS is reflected to the mirror and from the mirror is reflected with no significant change in polarization back to the relay optical system, toward the lamp, where it may be recycled. Due to the polarization separator and the half-wave plate, very little S-polarized light from the lamp will strike the PBS. The viewing optics 19 images the display on a screen or in the eye of the viewer.

As in FIG. 7, light from the tunnel 21 enters an imaging element 25 and a relay optical system 23 made up of two optical elements 27, 29. The relay optical system creates a telecentric image of the illumination from the lamp system at the display 17. The imaging element 25 makes an intermediate image of the lamp system at the first lens 27 of the relay system. The lenses of the relay system create the telecentric image of the intermediate image at the display. Accordingly, the exit end of the tunnel is imaged at infinity but the lamp is imaged at the display. As with the embodiment of FIG. 4, the imaging lens can be de-centered on the tunnel to relay the lamp image to the relay system.

In FIGS. 1 and 4, the light tunnel is shown as having a uniform cross-sectional size across its length, while in FIGS. 6, 7 and 8, the tunnel is shown as tapered. The angular intensity distribution as well as the overall brightness of the system can be enhanced by careful design of the light tunnel. A rectangular tunnel can be tapered on one pair of opposing sides from a square or rectangular cross-section at the entrance end to a square or rectangular cross-section (e.g. 4:3 or 16:9) at the exit end. The taper can be designed so that the exit end is larger. This can be used to reduce the exit angle of light from the tunnel. Alternatively, the tunnel can be tapered so that the entrance end is larger. This increases the exit angle of the light from the tunnel. The particular choice will depend on the light source and the optical system for relaying light to the display. In either case, adding an appropriate taper can allow the tunnel to fill the projection lens pupil more efficiently. This can make the lamp image elliptical and increase the pupil fill factor and light collection for a given F number.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in diagram form. The specific details may be supplied by one of average skill in the art as appropriate for any particular implementation.

Importantly, while embodiments of the present invention are described with reference to a video projector, the apparatus described herein are equally applicable to any type of illumination system for a polarization-based display, whether for projection or direct viewing, whether compact or not. For example, the techniques described herein are thought to be useful in connection with computer and data device displays, television and movie projectors, internet appliance viewers, and entertainment systems for video and game players.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A polarized light source system comprising:
   a light source to produce light having multiple polarization states;
   a relay optical system to relay light imaged onto the relay optical system onto a display;
   an optical imaging element to image light from the light source onto the relay optical system;
   a polarization separator to direct light of a first polarization to a first portion of the optical imaging element and light of a second orthogonal polarization to a second portion of the optical imaging element; and
   a polarization conversion element between the optical imaging element and the relay optical system to receive light having the second polarization from the optical imaging element and convert its polarization to the second polarization.

2. The system of claim 1, wherein the optical imaging element comprises a single lens and wherein the first portion comprises one half of the lens and the second portion comprises the other half of the lens.

3. The system of claim 1, wherein the polarization separator directs light of the first polarization in a first single light cone and the light of the second polarization in a second single light cone, the cones being imaged by the optical imaging element onto different portions of the relay optical system.

4. The system of claim 3, wherein the polarization conversion element is positioned in the portion of the relay optical system onto which the second cone is imaged.

5. The system of claim 1, wherein the polarization conversion element comprises a half-wave plate.

6. The system of claim 5, wherein the polarization conversion element is formed by a coating on a portion of an optical element of the relay optical system.

7. The system of claim 5, wherein the relay optical system comprises a set of relay optical elements to image the light from the optical imaging element onto the display, wherein light of the first polarization propagates on one side of the optical axis of the relay optical elements, light of the second polarization propagates on the other side of the optical axis, and wherein the polarization conversion element comprises a coating applied to an element of the set of relay optical elements.

8. The system of claim 7, wherein the relay optical system is decentered with respect to the polarization conversion element and the polarization conversion element is on a side of the optical axis of the relay optical elements opposite from the light source.

9. The system of claim 1, wherein the relay optical system and the optical imaging element are decentered with respect to the light source and centered with respect to the display.

10. The system of claim 1, wherein the light source comprises a lamp and a tunnel, the tunnel being configured to produce a cone of light having an aspect ratio corresponding to the display.

11. The system of claim 1, further comprising a polarizing beam splitter to receive the light from the relay optical system and direct light of the second polarization to the display.

12. The system of claim 1, wherein the polarization separator comprises adjacent prisms with orthogonal orientations and different indices of refraction.

13. The system of claim 12, wherein the indices of refraction differ by more than 1.5.

14. The system of claim 1, wherein the polarization separator comprises a plurality of Wollaston prisms.

15. The system of claim 1, wherein the polarization separator comprises a stacked array of thin films with alternating perpendicular axes.

16. A polarized light source system comprising:
   a light source to produce light having multiple polarization states;
   a tunnel to receive the light from the light source at an entrance aperture and to provide substantially telecentric light at an exit aperture;
   a polarization separator proximate the exit aperture to receive light from the tunnel exit aperture and to direct light of a first polarization in a first direction and light of a second orthogonal polarization in a second direction;
   a relay optical system to relay light of the first polarization and of the second polarization from the polarization separator onto a display; and
   a polarization conversion element between the polarization separator and the display to receive light having the second polarization and convert its polarization to the second polarization.

17. The system of claim 16, wherein the relay optical system has an optical axis that is centered with respect to the display, wherein the first direction is to a first side of the optical axis of the relay optical system and the second direction is to a second opposite side of the relay optical system, and wherein the polarization conversion element is on the first side of the optical axis of the relay optical system.

18. The system of claim 17, wherein the optical axis is centered with respect to the display.

19. The system of claim 16, further comprising an optical imaging element to image light from the tunnel onto the relay optical system.

20. The system of claim 19, wherein the optical imaging element comprises a single lens and wherein one half of the lens images light of the first polarization and the other half of the lens images light of the second polarization.

21. The system of claim 19, wherein the polarization separator directs light of the first polarization in a first single light cone and the light of the second polarization in a second single light cone, the cones being imaged by the optical imaging element onto different portions of the relay optical system.

22. The system of claim 21, wherein the polarization conversion element is positioned in the portion of the relay optical system onto which the second cone is imaged.

23. A method comprising:
   receiving light having multiple polarization states;
   collimating the received light;
   separating polarization states of the collimated light into two orthogonally polarized beams;
   directing the two beams in offset directions;
   receiving a first one of the two beams at a first portion of a relay optical system and relaying the first beam to a display;

receiving a second one of the two beams at a second portion of said relay optical system and relaying the second beam to the display;

rotating the polarization of the first beam to the polarization of the second beam after directing the two beams in offset directions.

24. The method of claim 23, wherein separating polarization states comprises directing the first beam in a first single light cone and directing the second beam in a second single light cone, the method further comprising imaging the two cones onto different portions of the relay optical system.

25. The method of claim 24, wherein relaying the first beam comprises propagating the first beam on one side of an optical axis of the relay optical system, wherein relaying the second beam comprises propagating the second beam on an opposite side of the optical axis of the relay optical system, and wherein rotating the polarization comprises propagating the first beam through a coating applied to an element of the relay optical system on one side of the optical axis.

* * * * *